United States Patent [19]
Efstratis

[11] 4,020,753
[45] May 3, 1977

[54] VENTILATION EXTENSION UNIT

[76] Inventor: Ernest Efstratis, 6775 Wing Lake Road, Birmingham, Mich. 48010

[22] Filed: Oct. 6, 1975

[21] Appl. No.: 619,618

[52] U.S. Cl. .............................. 98/40 C; 98/114
[51] Int. Cl.$^2$ .......................................... F24F 13/06
[58] Field of Search ............. 98/40 C, 32, 37, 114; 285/302

[56] References Cited
UNITED STATES PATENTS

| | | | |
|---|---|---|---|
| 2,389,310 | 11/1945 | Hess | 98/40 C |
| 2,824,575 | 2/1958 | Rosen | 285/61 |
| 2,847,034 | 8/1958 | Swett | 285/302 X |
| 3,225,679 | 12/1965 | Meyer | 98/114 |
| 3,359,883 | 12/1967 | Murphy | 98/40 C |

FOREIGN PATENTS OR APPLICATIONS 26,672  12/1905  United Kingdom ............... 98/40 C

*Primary Examiner*—Irwin C. Cohen
*Attorney, Agent, or Firm*—Whittemore, Hulbert & Belknap

[57] ABSTRACT

A portable air duct extension for a building heated or cooled by air and having a hot or cold air outlet or register. The duct extension comprises an elongated tubular member composed of telescoping sections. One section has an inlet opening and the other section has an outlet opening. Means such as magnets are provided for removably mounting the tubular member so that its intake opening overlies the air outlet. The telescoping sections permit the tubular member to be adjusted as to length to vary the point of discharge through the outlet opening. Baffles are provided to control the discharge of air from the outlet opening.

1 Claim, 3 Drawing Figures

VENTILATION EXTENSION UNIT

BACKGROUND AND SUMMARY OF THE INVENTION

Often a hot or cold air register is blocked by a piece of furniture. In such an instance, the discharge of hot or cold air into the room is impeded and the temperature balance in the room is disturbed.

The principal object of this invention is to provide a portable air duct extension for rerouting the air discharged from the wall outlet around the obstruction. This is done is accordance with the present invention without materially disturbing the free flow of air.

A further object of the invention is to provide a portable air duct extension which is composed of telescoping sections so as to be adjustable as to length. Accordingly, the air may be rerouted a greater or lesser distance depending upon the dimensions of the piece of furniture or other obstruction.

Another object of the invention is to provide a portable air duct extension having means, preferably magnet means, for removably mounting the same so that its inlet opening overlies the room air register.

A still further object of the invention is to provide a portable air duct extension which may be extended either laterally or vertically or in any direction.

Another object of the invention is to provide a portable air duct extension having an outlet opening controlled by baffles so as to distribute the air discharged more or less uniformly across the width of the opening.

Other objects and features of the invention will become more apparent as the decription proceeds, especially when taken in conjunction with the accompanying drawings, wherein.

Figure 1:
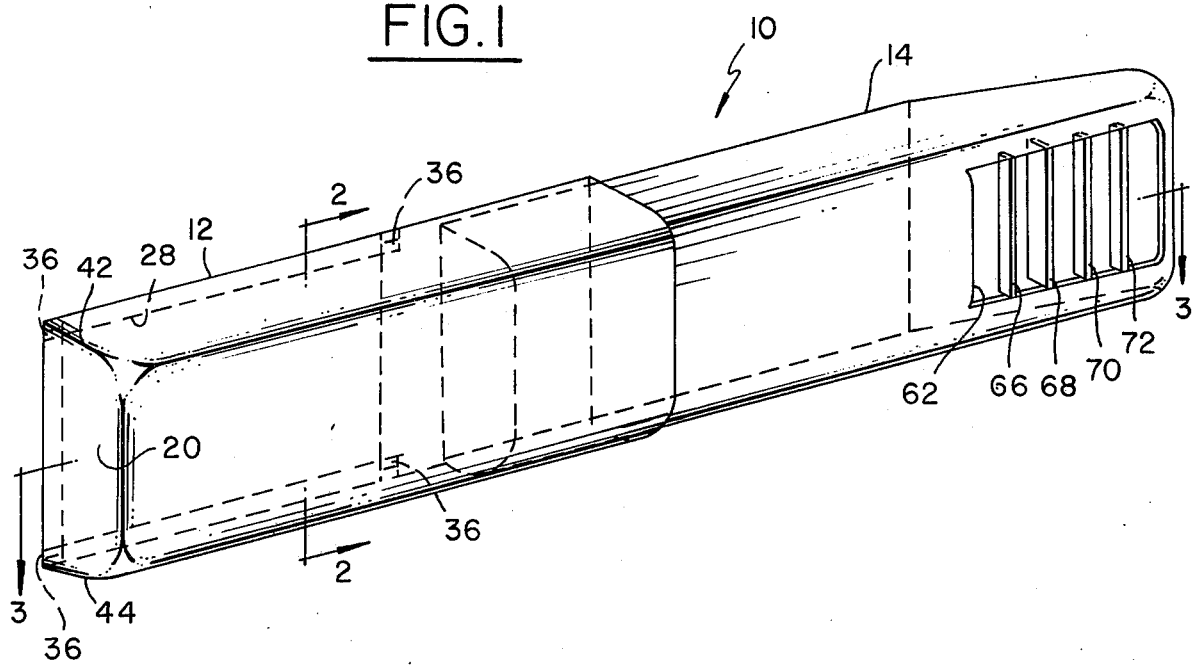
FIG. 1 is a perspective view of a portable air duct extension embodying my invention.

Referring now more particularly to the drawing, the portable air duct extension comprises a straight, elongated tubular member 10 composed of telescoping sections 12 and 14 permitting it to be adjustable as to length.

Figure 3:
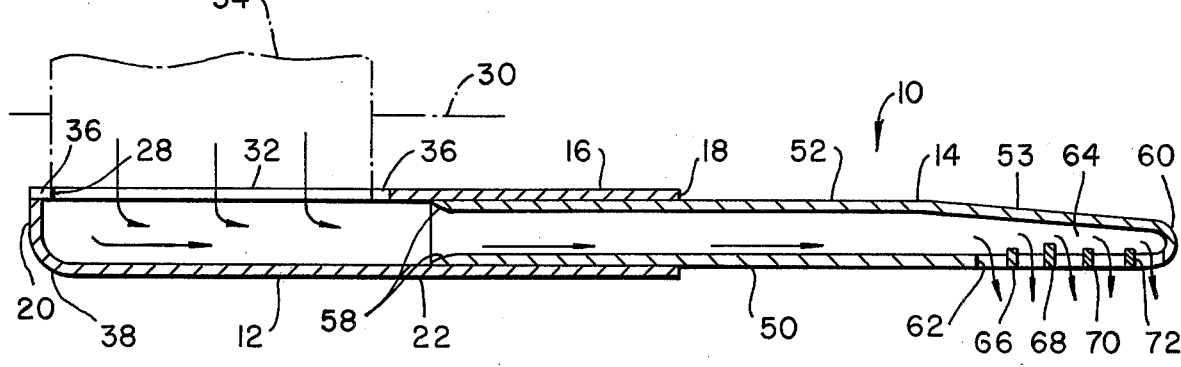
FIG. 3 is a sectional view taken on the line 3—3 in FIG. 1.

The tubular section 12 is a straight elongated member and has a flat rear wall 16. It is open at one end 18. The opposite end is closed by an end wall 20. The front wall 22 as well as the top and bottom walls 24 and 26 and the end wall 20 are imperforate. The front and rear walls 22 and 16 as well as the top and bottom walls 24 and 26 extend parallel to the longitudinal center line of the tubular member 10. The rear wall 16 is imperforate except for a rectangular inlet opening 28 adjacent the closed end 20 of a size adapted to fit over the usual hot or cold air outlet or register of the heating or cooling system in a residential home or other building. FIG. 3 shows the air duct extension mounted on the interior wall 30 of a building over the outlet 32 of the hot or cold air duct 34 by means of the magnets 36 provided at the four corners of the inlet opening 28 on the rear wall 16 of the tubular section 12. These magnets serve to removably hold the air duct extension in position with it inlet opening 28 covering the air outlet 32 of the duct 34 to receive the full discharge of air from the outlet. It will be noted that the rear wall 20 and front wall 22 merge into one another in a curve where indicated at 38, that the end wall 20 and top and bottom walls 24 and 26 likewise merge together in a curve where indicated at 42 and 44, and that the front wall 22 and top and bottom walls 24 and 26 merge in a curve where indicated at 46 and 48. These curved walls, particularly curved wall 38, of the section 12 serve as baffles to gently redirect the air discharged from the duct 32 and cause it to flow longitudinally of the tubular member 10 from left to right in FIG. 3. Such curved walls also eliminate sharp corners which might interfere with smooth air flow.

Figure 2:
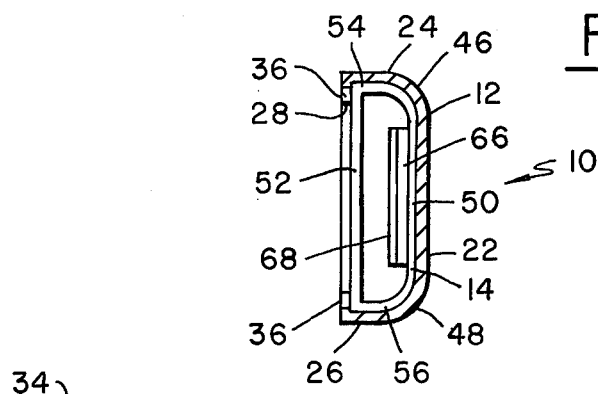
FIG. 2 is a sectional view taken on the line 2—2 in FIG. 1.

The other tubular section 14 is a straight elongated member and has a flat rear wall 52 and a front wall 50 connected to the top and bottom walls 54 and 56 in substantially the same configuration in cross section as the other tubular section 12 as seen in FIG. 2, although somewhat smaller in cross section so as to slidably fit within the section 12. The front, top and bottom walls extend parallel to the longitudinal center line of the tubular member 10. This is also true of most of the rear wall except for a portion near the closed end as will be described more fully hereinafter. The top and bottom walls 54 and 56 merge in a curve into the front wall as seen in FIG. 2 to eliminate the presence of sharp corners which might interfere with the flow of air. The telescoped end of the section 14 is open and its forward edge is beveled where indicated at 58 so as not to materially impede the flow of air. The opposite end of the section 14 is closed by an end wall 60 as shown.

The rear wall 52, top and bottom walls 54 and 56 and the end wall 60, are imperforate and the front wall 50 is also imperforate except for the outlet opening 62 adjacent end wall 60 from which air is dischraged into the room. The portion 53 of the rear wall 52 immediately behind the outlet opening 62 is flat and is inclined toward the front wall in a direction towards its end wall 60. This provides a discharge chamber 64 in the section 14 which gradually narrows towards the closed end of the tubular member.

The outlet opening 62 is show as being rectangular and the air discharged from the opening is controlled by a plurality of vertical baffles 66, 68, 70 and 72. These baffles are spaced apart substantially equal distances longitudinally of the air duct extension to separate the opening 62 into outlet slots of substantially equal width. These baffles project into the discharge chamber 64. Each baffle deflects a portion of the moving air for discharge through the slots. The width from front to rear of the discharge chamber 64 is greater near the baffle 66 at the rear end of the series than the baffle 70 at the remote end of the series and therefore some of the air will be picked off by each of the baffles in series so that more or less equal volumes of air discharge from each of the slots. However, it has been found that because the air when it reaches baffle 66 has not been subjected to any turbulence by baffle obstructions, the first slot in the series, that is the leftmost slot in FIG. 3, will discharge very little air unless the second baffle 8 is made to project into the chamber a greater distance than the first baffle 66. As seen in FIG. 3, all of the baffles project into chamber 64 the same distance except baffle 68 which projects a greater distance into the chamber.

The air duct extension may be extended either horizontally or vertically away from the register 32 depending on the dimensions of the obstruction in front of the register. Since the air duct extension is made of telescoping sections it may be adjusted as to length to vary the point at which air is discharged into the room. The magnets 36 for mounting the extension over the air outlet provide a convenient means of removable attachment without marring the mounting surface.

What I claim as my invention is:

1. A portable air duct extension especially for a building heated or cooled by air and having a hot or cold air register, said air duct extension comprising an elongated tubular member composed of sections longitudinally slidably telescoped together so as to permit said tubular member to be adjusted as to length, the telescoping ends of said sections being open and in unobstructed airflow communication with one another, an inlet opening in the rear wall of one of said sections and an outlet opening in the front wall of the other of said sections, the rear wall of said other section having a portion behind said outlet opening which is inclined toward said outlet opening in a direction away from said inlet opening to provide a gradually narrowing air discharge chamber, means for removably mounting said tubular number so that its inlet opening overlies the register to receive air from the latter and discharge the same through said outlet opening, and a plurality of at least three baffles controlling the discharge of air from said outlet opening, said baffles extending across said outlet opening in spaced apart relation longitudinally of said tubular member and projecting into said air discharge chamber, all of said baffles except the second baffle from said inlet opening projecting into said air discharge chamber the same distance and said second baffle projecting farther thereinto.

* * * * *